3,235,516
PYROLYSIS OF DIARYLSULFONES TO THE CORRESPONDING DIARYLETHANES AND POLYMERS
Edward C. Leonard, Jr., Plainfield, N.J., assignor to Union Carbide Corporation, a corporation of New York
No Drawing. Filed Oct. 22, 1962, Ser. No. 232,247
20 Claims. (Cl. 260—2)

This application is a continuation-in-part of my application Serial No. 150,143, filed November 6, 1961, which is now abandoned.

This invention relates to diarylsulfones and to a process for the pyrolysis thereof to the corresponding diarylethanes and polymers. More particularly, this invention relates to the preparation of 1,2-diarylethanes and p-xylylene polymers by the pyrolysis of diarylsulfones.

The preparation of diarylethanes has been accomplished, in general, by reacting a compound such as toluene or xylene with acetylene at relatively low temperatures. This and other comparable processes have been found to be undesirable, however, as the yield of diarylethanes has been relatively low. Furthermore, acetylene, being readily combustible, has presented many serious problems in handling. As a result, processes utilizing acetylene as a reactant have found little, if any, commercial acceptance. Moreover, p-xylylene polymers have heretofore been produced by the pyrolysis of xylenes at temperatures of 800–1000° C. The polymer formed by the high temperature pyrolysis of xylene was found to be of non-uniform quality and so generally cross-linked and insoluble in low-boiling solvents as to limit its use even when of acceptable quality.

The present invention provides for diarylsulfones and for the preparation of 1,2-diarylethanes and simple and substituted p-xylylene polymers therefrom, in satisfactory yields and in relatively short periods of time, without the necessity of utilizing combustible reactants. The present invention, therefore provides for the preparation of 1,2-diarylethanes and p-xylyene polymers by a commercially attractive process.

In its broadest aspect, the present invention relates to the preparation of 1,2-diarylethanes by the pyrolysis of vaporized diarylsulfones at temperatures of about 400° C. to about 800° C. and preferably of about 600° C. to about 700° C. with the result that the diarylsulfone is decomposed to a benzyl free radical which thereafter condenses to form the corresponding 1,2-diarylethane. It has also been found that diarylsulfones containing alpha carbon atoms being bonded in para position to a benzene moiety, can also form benzyl free radicals which upon condensation simultaneously polymerize to form polymers of the p-xylylene family.

At temperatures lower than 400° C., little, if any, diarylsulfone is pyrolyzed to the corresponding reaction products. Pyrolyzing a diarylsulfone at temperatures higher than about 800° C. results in side reactions taking place with undesirable by-products being formed. For example, at temperatures above about 800° C. cleavage of ring and/or additional alpha substituents can occur resulting in a tri- or poly-functional species yielding cross-linked or highly branched polymers. This, of course, results in significantly lower yields of diarylethanes and polymers.

In still another aspect of the present invention, a diarylsulfone is vaporized by heating at a temperature of about 50° C. above the melting point of the compound and under pressure of about $10^{-5}$ mm. of Hg to about 250 mm. of Hg and preferably under a pressure of about 0.1 mm. of Hg to about 5 mm. of Hg and thereafter pyrolyzing the vaporized diarylsulfone at temperatures defined in the preceding paragraph.

The reaction which results in the formation of 1,2-diarylethanes alone in accordance with the present invention can be illustrated by the following equation wherein the diarylsulfone is decomposed to a benzyl monoradical which condenses on cooling to the diarylethane thusly:

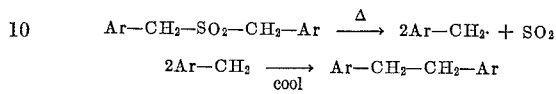

wherein Ar— represents a substituted or unsubstituted aromatic nuclei. Thus in this reaction any diaryl sulfone of the above formula can be employed as long as the aryl-sulfone bond is the weakest of any chemical bond in the diarylsulfone.

The reaction which results in the formation of 1,2-diarylethanes and p-xylylene polymers in accordance with the present invention can be illustrated by the following equations wherein the diarylsulfone which is decomposed by pyrolysis is represented by the general formula

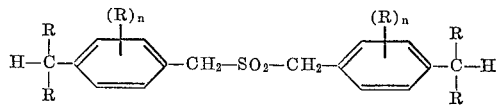

wherein R represents substituents whose heat of dissociation, that is, the heat required to cleave each substituent from the ring, is greater than the heat of dissociation of the sulfone to the corresponding benzyl radical and $n$ is a number from 0 to 4. The pyrolysis of a vaporized diarylsulfone at a temperature of about 400° C. to about 800° C. results in the quantitative elimination of sulfur dioxide and the simultaneous formation of benzyl free radicals as shown in the following equation:

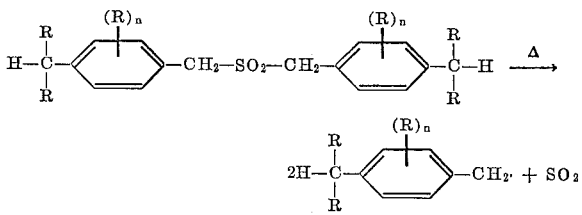

The benzyl free radicals thus having a labile hydrogen on an alpha carbon attached in para position to a benzyl nucleus can undergo the basic reactions of disproportionation and/or coupling to form the diarylethanes and p-xylylene polymers of the present invention. The benzyl free radicals can undergo disproportionation to form one molecule of α-substituted-p-xylene and a benzyl diradical also known as a xylylene diradical as shown in the following equation:

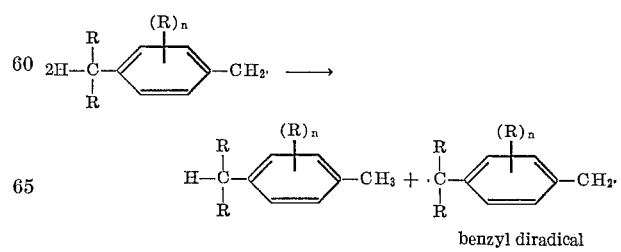

benzyl diradical

The benzyl or xylylene diradical polymerizes instantaneously upon condensation to form a p-xylylene polymer. While not wishing to be bound by any theory or mechanism, it has been postulated that the diradical undergoes rearrangement to a quinoid intermediate prior to polymer formation:

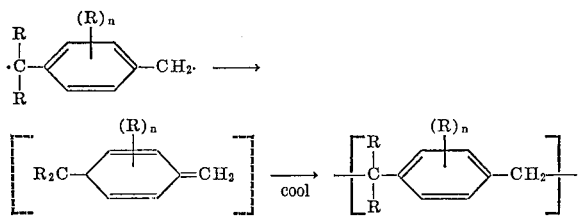

The benzyl radicals in this reaction also undergo coupling to give symmetrical diarylethanes as follows:

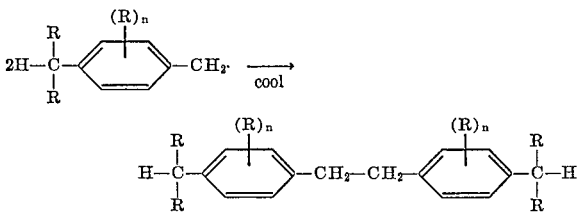

Due to the disproportionation and coupling reactions which these benzyl free radicals can undergo, it is clear that both benzyl mono-radicals and benzyl diradicals can exist prior to condensation. Therefore, by the term "benzyl free radicals" as used herein and in the appended claims is meant both benzyl monoradicals and benzyl or xylylene diradicals.

Illustrative of suitable diarylsulfones which can be pyrolyzed in accordance with this invention to yield poly (p-xylyllenes) simultaneously with the diarylsulfones are the dibenzylsulfones having the formula:

FORMULA I

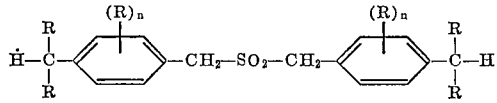

although in the broadest concept of this invention to produce diarylethanes, any diaryl sulfone can be employed as long as the heat of dissociation of the aryl-sulfone bond is the weakest of any chemical bond in the diaryl sulfone. For example, specifically contemplated are the dibenzyl sulfones of the formula:

FORMULA II

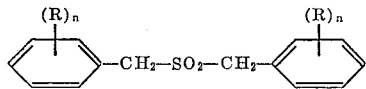

and the dinaphthyl sulfones of the formula:

FORMULA III

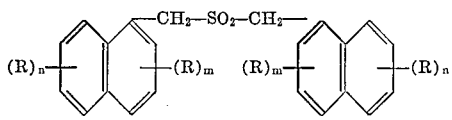

where in Formulas I, II and II above, the R substituents can be the same or different, are either hydrogen, hydroxyl, carboxyl, cyano, alkyl radicals, generally containing from 1 to 20 carbon atoms inclusive such as methyl, ethyl, n-propyl, isopropyl, n-butyl and the like; cycloalkyl radicals, generally containing from 3 to 10 carbon atoms inclusive, such as cyclohexyl and the like; unsaturated alicyclic and unsaturated aliphatic hydrocarbon radicals, generally containing from 2 to 20 carbon atoms inclusive, such as cyclopentenyl, allyl and the like; halogenated alkyl and cycloalkyl radicals, generally containing from 1 to 20 carbon atoms inclusive, such as chloroethyl, bromoethyl, fluoroethyl, 2-chloro-n-propyl, 2-bromo-n-propyl, 2-chloro-n-butyl and the like; alkoxy and aryloxy substituted alkyl and cycloalkyl radicals, generally containing from 1 to 20 carbon atoms inclusive such as methoxymethyl, ethoxyethyl, 3-ethoxy-n-propyl, 4-ethoxy-n-butyl, 2-methoxycyclohexyl, phenoxymethyl, 2-phenoxyethyl and the like; aralkyl radicals, generally containing from 7 to 20 carbon atoms inclusive, such as benzyl, 2-phenylethyl, 3-phenyl-n-propyl, 1-phenyl-n-butyl and the like; argyl radicals, generally containing from 6 to 18 carbon atoms inclusive, such as phenyl, tolyl, benzyl and the like; halogenated aryl radicals, generally containing from 6 to 18 carbon atoms inclusive, such as p-chlorophenyl, p-bromophenyl, p-fluorophenyl, p-iodiophenyl and the like; aryl radicals, generally containing from 6 generally containing from 7 to 20 carbon atoms inclusive, such as p-methoxyphenyl, p-ethoxyphenyl, p,n-propoxyphenyl and the like; alkaryl radicals, such as o-methylphenyl, p - ethylphenyl, p,n - propylphenyl, o,n - propylphenyl and the like; also alkyl radicals, cycloalkyl radicals, unsaturated alicyclic radicals, unsaturated aliphatic hydrocarbon radicals, halogenated alkyl and cycloalkyl radicals; alkoxy and aryloxy substituted alkyl and cycloalkyl radicals, aralkyl radicals, aryl radicals, halogenated aryl radicals, alkoxy and aryloxy substituted aryl radicals, alkaryl radicals, as described previously which are substituted with one or more hydroxyl, cyano or carboxyl groups and wherein $n$ is a number from 0 to 4 inclusive and $m$ is a number from 0 to 3 inclusive.

Compounds falling within the purview of Formula I and Formula II can be conveniently prepared by reacting sodium sulfide with at least two moles of a compound having the formula:

FORMULA IV

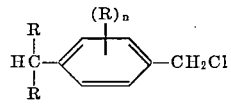

or a compound having the formula:

FORMULA V

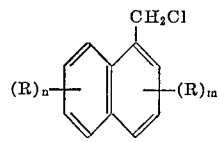

wherein the R substituents and $m$ and $n$ are as previously defined, per mole of sodium sulfide, at a temperature of about 80° C. to produce the corresponding diarylsulfide. The diarylsulfide is then oxidized to the corresponding sulfone by oxidation with peracetic acid.

The process by which a diarylsulfone is pyrolyzed to form the corresponding 1,2-diarylethane and p-xylylene polymer can be conducted using any suitable apparatus. As a matter of convenience, the reaction is generally conducted in a glass tube as is further described in the examples of this specification, wherein the diarylsulfone is vaporized, the vapor pyrolyzed to form the corresponding vaporous benzyl free radicals and the vaporous benzyl free radicals then condensed to solids on the interior surface of the glass tube. The solids are then recovered by simply being scraped off the surface of the glass tube. Due to the solubility of the low molecular weight diarylethanes in hot alcohols and organic acids, the separation of the polymer from the diaryl ethanes can easily be accomplished by admixing the recovered solids in hot alcohol or organic acid wherein the polymer is insoluble, filtering the mixture to recover the solid polymer, and thereafter recovering the diarylethane by recrystallization or other similar recovery techniques.

As a rule, the actual length of time that the diarylsulfone vapors are pyrolyzed at temperatures on the order of about 400° C. to about 800° C. will, of course, vary and depend upon the compound being heated. From a practical standpoint this length of time will vary from about 1 minute to about 30 minutes.

The following examples further illustrate the present invention and are not intended to limit the scope thereof in any manner.

Example 1

This example illustrates the process by which 1,2-di-p-tolylethane and poly-p-xylylene are produced by the pyrolytic decomposition of di-p-xylylsulfone. This preparation can be illustrated by the following reaction:

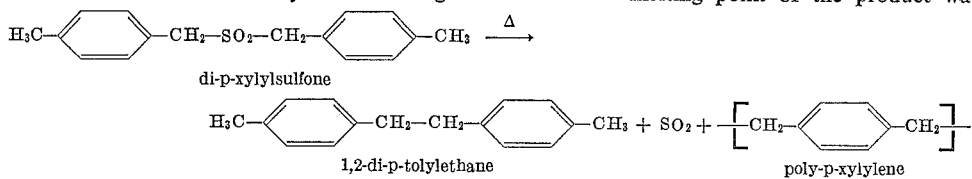

di-p-xylylsulfone 1,2-di-p-tolylethane   poly-p-xylylene

A Pyrex glass tube, 36 inches in length and ¾ of an inch in diameter was connected to a vacuum pump and was provided with an ice trap at its end nearest the vacuum pump. Intermediate the ends of the tube and around the exterior surface thereof, there was positioned an electric furnace which had a length of 12 inches. Nine hundred ninety-two and two-tenths milligrams of di-p-xylylsulfone was placed just inside of the tube at its open end, this end was then sealed and wrapped in a heating tape. A pressure of 0.1 mm. of mercury was maintained in the tube and the temperature of the heating tape was maintained at about 235° C. Within 23 minutes the di-p-xylylsulfone sublimed and the vapors produced passed into that zone of the tube which was heated by the electric furnace. The electric furnace was maintained at a temperature of 600° C. The di-p-xylylsulfone vapors pyrolytically decomposed in this zone and the product vapors formed condensed, forming crystals on the cool interior surface of the glass tube on the down-stream side of the furnace. The sulfur dioxide vapors were collected in the ice trap. Seven minutes after sublimation heating was discontinued, the apparatus disassembled, the tube broken open and the crystals in the tube recovered.

The pyrolysate was found to consist of a liquid, a polymer, and a low molecular weight solid. The liquid was identified by refractive index as xylene. The polymer was shown to be poly-p-xylylene by comparison with the infrared spectrum of that of a known sample. The low molecular weight solid was recrystallized from hot ethanol in which the polymer was insoluble and was identified as 1,2-di-p-tolylethane by infrared spectrum and by melating point determination. The infrared spectrum of the low molecular weight product was identical to that of an authentic sample of 1,2-di-p-tolylethane. The melting point of the solid was 79° C. to 82° C. The melting point of 1,2-di-p-tolylethane as reported in "Dictionary of Organic Compounds," Helibron, Oxford Press, New York, 1953, volume II, page 61, is 82° C. to 83° C. A mixture of an authentic sample of 1,2-di-p-tolylethane and the product produced had a melting point of 79° C. to 82° C.

The yield of 1,2-di-p-tolylethane based on the weight of di-p-xylylsulfone consumed was 97 percent and the remainder was poly-p-xylylene.

Example 2

This example was conducted in a manner identical to that described in Example 1 with, however, the following exceptions: (1) 1550 milligrams of dibenzylsulfone were used, (2) the heating tape was maintained at a temperature of 240° C., (3) the furnace was maintained at a temperature of 650° C.

This example illustrates the process by which 1,2-diphenylethane is produced by the pyrolytic decomposition of dibenzylsulfone. This preparation can be illustrated by the following equation:

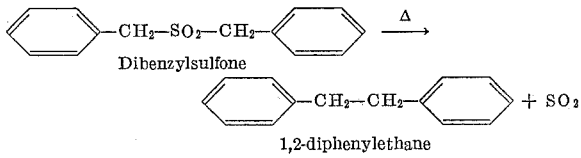

Dibenzylsulfone 1,2-diphenylethane

The product was identified as 1,2-diphenylethane by infrared spectrum and by melting point determination. The infrared spectrum of the product was identical to that of an authentic sample of 1,2-diphenylethane. The melting point of the product was 49.5° C. to 52° C.

The melting point of 1,2-diphenylethane as reported in the "Dictionary of Organic Compounds" is 52° C. A mixture of an authentic sample of 1,2-diphenylethane and the product produced had a melting point of 49.5° C. to 52° C.

The yield of 1,2-diphenylethane based on the weight of dibenzylsulfone consumed was 93 percent. Due to the lack of a suitable substituent as hereinbefore defined in para position, polymer formation was not found possible.

Example 3

(a) Preparation of bis - (4 - methylnaphthyl-1-methyl) sulfone having the formula:

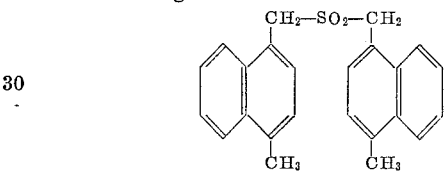

Sodium sulfide nonahydrate, in an amount of 12 grams, was admixed with 19 grams of 1-chloromethyl-4-methylnaphthalene and the mixture was heated at reflux for 24 hours. The reacted mixture was poured into water with the result that two layers formed, an organic layer and a water layer. The organic layer was extracted using diethyl ether and the diethyl ether was removed, leaving a viscous oil. The oil was dissolved in acetic acid and to this solution there was then added a stoichiometric amount of hydrogen peroxide. This solution was heated at a temperature of about 60° C. to about 80° C. for about 1 hour. The solution was then cooled to about 23° C. and the bis-(4-methylnaphthyl-1-methyl)sulfone precipitated out of solution.

The yield of bis-(4-methylnaphthyl - 1 - methyl)sulfone based on the weight of 1-chloromethyl-4-methylnaphthalene charged was 60 percent. No significant amount of polymer was recovered.

Analysis for bis-(4-methylnaphthyl-1-methyl)sulfone: Found: C, 77.08; H, 6.05; S, 8.43. Calculated: C, 76.96; H, 5.98; S, 8.56.

The melting point of the sulfone was found to be 245° C.–246° C.

(b) Preparation of 1,2-bis-(4 - methylnaphthyl)ethane by the pyrolysis of bis - (4 - methylnaphthyl - 1 - methyl)sulfone.

This example (3–b) was conducted in a manner identical to that described in Example 1 with, however, the following exceptions: (1) 710 milligrams of bis-(4-methylnaphthyl-1-methyl)sulfone were used, and (2) a pressure of 0.3 mm. of mercury was maintained in the tube.

Preparation of 1,2-bis - (4 - methylnaphthyl)ethane can be illustrated by the following equation:

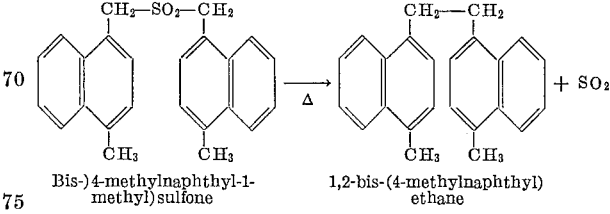

Bis-)4-methylnaphthyl-1-methyl)sulfone 1,2-bis-(4-methylnaphthyl)ethane

The yield of 1,2-bis-(4-methylnaphthyl)ethane based on the weight of bis-(4-methylnaphthyl-1-methyl)sulfone consumed was 52 percent.

Analysis for 1,2-bis-(4-methylnaphthyl)ethane: Found: C, 93.02; H, 7.28. Calculated: C, 92.90; H, 7.09.

The melting point of this ethane was determined to be 154° C.–155° C.

1,2-bis-(4-methylnaphthyl)ethane can be used as a heat transfer medium, a high temperature lubricant and as a softener for rubber.

*Example 4*

(a) Preparation of bis(4-isopropylbenzyl)sulfone having the formula:

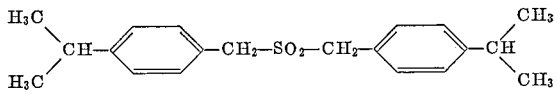

Cumene, in an amount of 96 grams, was admixed with 64 grams of chloromethyl methyl ether and 57 grams of stannic chloride at a temperature of 10° C. for about 2 hours. The reacted mixture was then steam distilled and the distillate, which separated into an organic layer and an aqueous layer was recovered. The organic layer, separated from the aqueous layer by decantation, was dried over calcium chloride and then was distilled. The 4-(chloromethyl)cumene recovered as the distillate after rectification, was then admixed with 12 grams of sodium sulfide nonahydrate and the mixture was heated at reflux for 24 hours. The reacted mixture was poured into water with the result that two layers formed, an organic layer and a water layer. The organic layer was extracted using diethyl ether and the ether removed leaving a viscous oil. The oil was dissolved in acetic acid and to this solution there was then added a stoichiometric amount of hydrogen peroxide. This solution was heated at a temperature of about 60° C. to about 80° C. for about 1 hour. The solution was then cooled to about 23° C. and the 4,4′-diisopropyldibenzylsulfone precipitated out of solution.

The yield of bis((4-isopropylbenzyl)sulfone based on the weight of the 4-(chloromethyl)cumene charged was 90 percent.

Analysis for bis(4-isopropylbenzyl)sulfone: Found: C, 72.76; H, 8.12; S, 10.01. Calculated: C, 72.57; H, 7.91; S, 9.67.

The melting point of the sulfone was found to be 143° C.–144° C.

(b) Preparation of 1,2-bis-(4-isopropylphenyl)ethane and poly(α,α-dimethyl-p-xylylene) by the pyrolysis of bis(4-isopropylbenzyl)sulfone.

This example (4–b) was conducted in a manner identical to that described in Example 1 with, however, the following exceptions: (1) 520 milligrams of bis(4-isopropylbenzyl)sulfone were used, (2) a pressure of 0.3 mm. of Hg was maintained in the tube, and (3) the furnace was maintained at a temperature of 660° C.

Preparation of 1,2-bis-(4-isopropylphenyl)ethane and poly(α,α-dimethyl-p-xylylene) can be illustrated by the following equation:

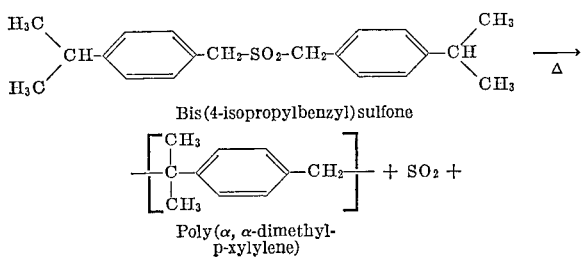

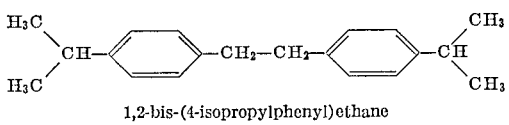
1,2-bis-(4-isopropylphenyl)ethane

The pyrolysate was found to consist of a polymer, a low molecular weight solid, and a liquid. The liquid was isolated in a trap and the polymer and solid were found together in the exit from the furnace. The low molecular weight solid was recrystallized from hot acetic acid since the polymer was not soluble in hot acetic acid.

The yield of 1,2-bis-(4-isopropylphenyl)ethane on the weight of bis(4-isopropylbenzyl)sulfone consumed was 80 percent.

Analysis for 1,2 - bis - (4 - isopropylphenyl)ethane: Found: C, 90.10; H, 9.90. Calculated: C, 90.22; H, 9.77.

The melting point of this ethane was determined to be 57.5° C.–58.0° C.

The novel polymer poly(α,α-dimethyl-p-xylylene) was a white, fluffy material which had a reduced viscosity of 1.1 in toluene at 80° C. and at a concentration of 0.2%. The polymer had a softening range of 235° C. to 250° C. the yield was approximately 5%.

The polymer, unlike other members of the p-xylylene family, is relatively soluble in aromatic hydrocarbons at room temperature. The polymer is useful as a coating material and an adhesive.

1.2-bis-(4-isopropylphenyl)ethane can be used as a heat transfer medium, a high temperature lubricant and as a softener for rubber.

*Example 5*

(a) Preparation of bis(4-benzylbenzyl)sulfone having the formula:

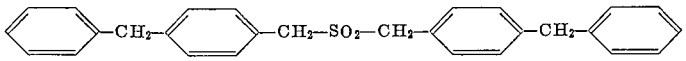

Diphenylmethane, in an amount of 96 grams, was admixed with 64 grams of chloromethyl methyl ether and 51 grams of stannic chloride at a temperature of 10° C. for about one hour. The reacted mixture was then steam distilled and the distillate, which separated into an organic layer and an aqueous layer was recovered. The oganic layer, separated from the aqueous layer by decantation, was dried over calcium chloride. The 4-benzyl-1-chloromethylbenzene so produced was then admixed with 50 grams of sodium sulfide nonahydrate and the mixture was heated at reflux for 24 hours. The reacted mixture was poured into water with the result that two layers formed, an organic layer and a water layer. The organic layer was extracted using diethyl ether and the diethyl ether removed therefrom, leaving a viscous oil. The viscous oil was dissolved in acetic acid and to this solution there was then added a stoichiometric amount of hydrogen peroxide. This solution was heated at a temperature of about 60° C. to about 80° C. for about 1 hour. The solution was then cooled to about 23° C. and the bis(4-benzylbenzyl)sulfone precipitated out of solution.

The yield of bis(4-benzylbenzyl)sulfone based on the weight of the 4-benzyl-1-chloromethylbenzene charged was 90 percent.

Analysis for bis(4-benzylbenzyl)sulfone: Found: C, 78.54; H, 6.21; S, 7.27. Calculated: C, 78.83; H, 6.10; S, 7.51.

The melting point of the sulfone was found to be 213° C.–214° C.

(b) Preparation of 1,2-bis-(4-benzylphenyl)ethane and poly(α-phenyl-p-xylylene) by the pyrolysis of bis(4-benzylbenzyl)sulfone.

This example (5–b) was conducted in a manner identical to that described in Example 1.

Preparation of 1,2-bis-(4-benzylphenyl)ethane and poly (α-phenyl-p-xylylene) can be illustrated by the following equation:

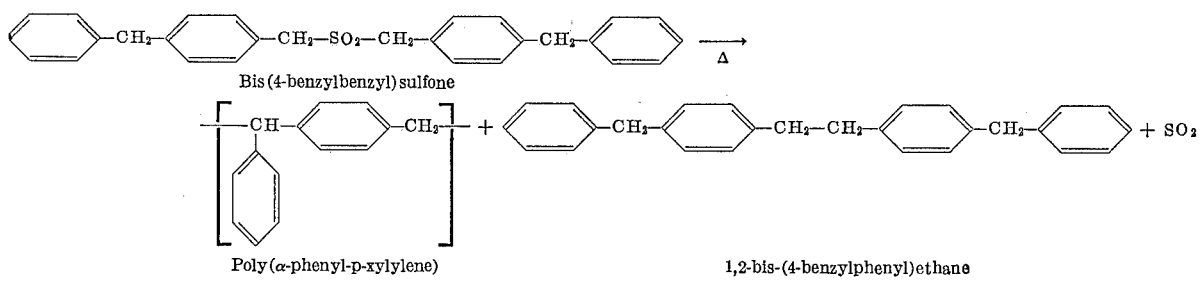

Poly(α-phenyl-p-xylylene)

The yield of 1,2-bis-(4-benzylphenyl)ethane based on the weight of bis(4-benzylbenzyl)sulfone consumed was 90 percent.

Analysis for 1,2-bis-(4-benzylphenyl) ethane: Found: C, 93.01; H, 7.21. Calculated: C, 92.82; H, 7.19.

The melting point of this ethane was determined to be 96° C.–97° C.

The novel polymer had a reduced viscosity of 1.2 in toluene at 70° C. at a concentration of 0.2% and was obtained in 10% yield. The polymer can be useful as a coating material and an adhesive.

1,2-bis-(4-benzylphenyl)ethane can be used as a heat transfer medium, a high temperature lubricant and as a softener for rubber.

What is claimed is:

1. Process which comprises pyrolyzing a vaporized diarylsulfone having the general formula $$Ar-CH_2-SO_2-CH_2-Ar$$

wherein Ar— is an aromatic hydrocarbon containing from 6 to about 30 carbon atoms at a temperature of about 400° C. to about 800° C. for a period of time sufficient to form benzyl free radicals, condensing said radicals, and thereafter recovering the condensation products.

2. Process as defined in claim 1 wherein the vaporized diarylsulfone is pyrolyzed at a temperature of about 600° C. to about 700° C.

3. Process which comprises heating a vaporized diarylsulfone having the formula:

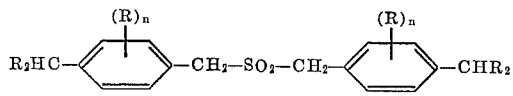

wherein the R substituents are those whose heat of dissociation is greater than the heat of dissociation of the said sulfone to the corresponding ethane and are selected from the group consisting of hydrogen, hydroxy, carboxyl, cyano, hydrocarbyloxy, hydrocarbyl, halogenated hydrocarbyl, and alkoxy and aryloxy substituted hydrocarbyl, and $n$ is a number from 0 to 4 inclusive, at a temperature of about 400° C. to about 800° C. whereby said diarylsulfone is pyrolyzed to the corresponding 1,2-diarylethane and polymer and thereafter recovering the condensation products.

4. Process which comprises heating a vaporized diarylsulfone having the formla:

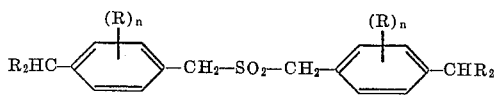

wherein the R substituents are those whose heat of dissociation is greater than the heat of dissociation of the said sulfone to the corresponding ethane and are selected from the group consisting of hydrogen, hydroxy, carboxyl, cyano, hydrocarbyloxy, hydrocarbyl, halogenated hydrocarbyl, and alkoxy and aryloxy substituted hydrocarbyl, and $n$ is a number from 0 to 4 inclusive, at a temperature of about 600° C. to about 700° C. whereby said diarylsulfone is pyrolyzed to the corresponding 1,2-diarylethane and polymer and thereafter recovering the condensation products.

5. Process which comprises heating a vaporized diarylsulfone having the formula:

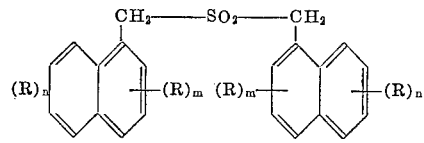

wherein the R substituents are those whose heat of dissociation is greater than the heat of dissociation of the said sulfone to the corresponding ethane and are selected from the group consisting of hydrogen, hydroxy, carboxyl, cyano, hydrocarbyloxy, hydrocarbyl, halogenated hydrocarbyl, and alkoxy and aryloxy substituted hydrocarbyl, said $m$ is a number from 0 to 3 inclusive and $n$ is a number from 0 to 4 inclusive, at a temperature of about 400° C. to about 800° C. whereby said diarylsulfone is pyrolyzed to the corresponding 1,2-diarylethane.

6. Process which comprises heating a vaporized diarylsulfone having the formula:

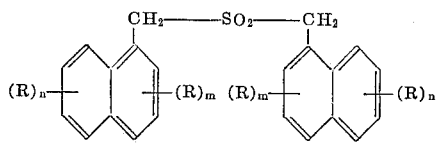

wherein the R substituents are those whose heat of dissociation is greater than the heat of dissociation of the said sulfone to the corresponding ethane and are selected from the group consisting of hydrogen, hydroxy, carboxyl, cyano, hydrocarbyloxy, hydrocarbyl, halogenated hydrocarbyl, and alkoxy and aryloxy substituted hydrocarbyl, and $m$ is a number from 0 to 3 inclusive, and $n$ is a number from 0 to 4 inclusive, at a temperature of about 600° C. to about 700° C. whereby said diaryl sulfone is pyrolyzed to the corresponding 1,2-diarylethane.

7. Process which comprises heating a vaporized dibenzylsulfone having the formula:

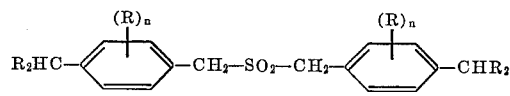

wherein R is a member selected from the group consisting of alkyl and aryl radicals and $n$ is a number from 0 to 4 inclusive, at a temperature of about 400° C. to about 800° C. whereby said dibenzylsulfone is pyrolyzed to the corresponding 1,2-diarylethane and polymer and thereafter recovering the condensation products.

8. Process which comprises heating a vaporized diarylsulfone having the formula:

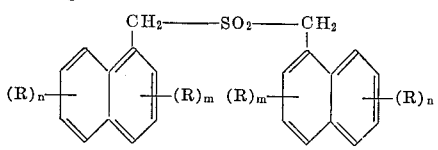

wherein the R substituents are selected from the group consisting of hydrogen and alkyl radicals, $m$ is a number from 0 to 3 inclusive and $n$ is a number from 0 to 4 inclusive, at a temperature of about 400° C. to about 800° C. whereby said diarylsulfone is pyrolyzed to the corresponding 1,2-diaryl-ethane.

9. Process which comprises heating a vaporized diarylsulfone having the formula:

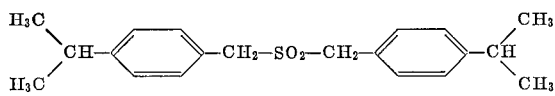

at a temperature of about 400° C. to about 800° C. to produce 1,2-bis-(4-isopropylphenyl)ethane and poly(α,α-dimethyl-p-xylylene) and thereafter recovering the condensation products.

10. Process which comprises heating a vaporized diarylsulfone having the formula:

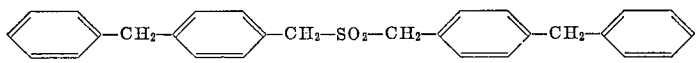

at a temperature of about 400° C. to about 800° C. to produce 1,2-bis-(4-benzylphenyl)ethane and poly(α-phenyl-p-xylylene) and thereafter recovering the condensation products.

11. Process which comprises heating a vaporized diarylsulfone having the formula:

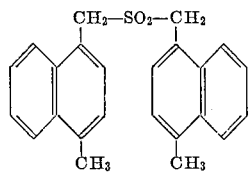

at a temperature of about 400° C. to about 800° C. to produce 1,2-bis-(4-methylnaphthyl)ethane.

12. Process which comprises heating a vaporized diarylsulfone having the formula:

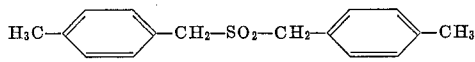

at a temperature of about 400° C. to about 800° C. to produce 1,2,-di-p-tolylethane and poly(p-xylylene) and thereafter recovering the condensation products.

13. Process which comprises heating a vaporized diarylsulfone having the formula:

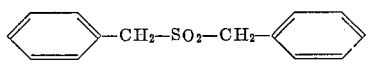

at a temperature of about 400° C. to about 800° C. to produce 1,2-diphenylethane.

14. Process which comprises vaporizing a diarylsulfone having the general formula: Ar—CH$_2$—SO$_2$—CH$_2$—Ar wherein Ar— is an aromatic hydrocarbon containing from 6 to about 30 carbon atoms, under a pressure of 10$^{-5}$ mm. of Hg to about 250 mm. of Hg. and thereafter heating said vaporizing diarylsulfone at a temperature of about 400° C. to about 800° C. whereby said vaporized diarylsulfone is pyrolyzed to the corresponding 1,2-diarylethane and p-xylylene polymer and thereafter recovering the condensation products.

15. Process as defined in claim 14 wherein said diarylsulfone has the formula:

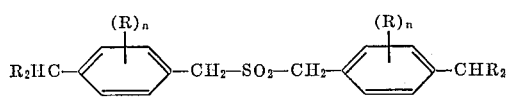

wherein the R substituents are those whose heat of dissociation is greater than the heat of dissociation of the said sulfone to the corresponding ethane and p-xylylene polymer and are selected from the group consisting of hydrogen, hydroxy, carboxyl, cyano, hydrocarbyloxy, hydrocarbyl, halogenated hydrocarbyl, and alkoxy and aryloxy substituted hydrocarbyl, and $n$ is a number from 0 to 4.

16. Process as defined in claim 14 wherein said diaryl-

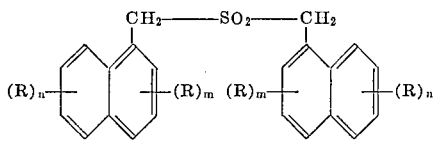

wherein the R substitutents are those whose heat of dissociation is greater than the heat of dissociation of the said sulfone to the corresponding ethane and are selected from the group consisting of hydrogen, hydroxy, carboxyl, cyano, hydrocarbyloxy, hydrocarbyl, halogenated hydrocarbyl, and alkoxy and aryloxy substituted hydrocarbyl, and $m$ is a number from 0 to 3 inclusive and $n$ is a number from 0 to 4 inclusive.

17. Process which comprises vaporizing a diarylsulfone having the general formula: Ar—CH$_2$—SO$_2$—CH$_2$—Ar wherein AR— is an aromatic hydrocarbon containing from 6 to about 30 carbon atoms, by heating said diarylsulfone at a temperature at about its melting point to about 50° C. above its melting point and under a pressure of about 10$^{-5}$ mm. of Hg to about 250 mm. of Hg and thereafter heating said vaporized diarylsulfone at a temperature of about 400° C. to about 800 C. whereby said vaporized diarylsulfone is pyrolyzed to the corresponding 1,2-diarylethane and p-xylylene polymer and thereafter recovering the condensation products.

18. Process which comprises vaporizing a diarylsulfone having the general formula: Ar—CH$_2$—SO$_2$—CH$_2$—Ar wherein Ar— is an aromatic hydrocarbon containing from 6 to about 30 carbon atoms, by heating said diarylsulfone at a temperature at about its melting point to about 50° C. above its melting point and under a pressure of about 10$^{-5}$ mm. of Hg to about 250 mm. of Hg and thereafter heating said vaporized diarylsulfone at a temperature of about 600° C. to about 700° C. whereby said vaporized diarylsulfone is pyrolyzed to the corresponding 1,2-diarylethane and p-xylylene polymer and thereafter recovering the condensation products.

19. Process which comprises vaporizing a diarylsulfone having the general formula: Ar—CH$_2$—SO$_2$—CH$_2$—Ar wherein Ar— is an aromatic hydrocarbon containing from 6 to about 30 carbon atoms, by heating said diarylsulfone at a temperature at about its melting point to about 50° C. above its melting point and under a pressure of about 0.1 mm. of Hg to about 5 mm. of Hg. and thereafter heating said vaporized diarylsulfone at a temperature of about 400° C. to about 800° C. whereby said vaporized diarylsulfone is pyrolyzed to the corresponding 1,2-diarylethane and p-xylylene polymer and thereafter recovering the condensation products.

20. Process which comprises vaporizing a diarylsulfone having the general formula Ar—CH$_2$—SO$_2$—CH$_2$—Ar wherein Ar— is an aromatic hydrocarbon containing from 6 to about 30 carbon atoms, by heating said diarylsulfone at a temperature at about its melting point to about 50° C. above its melting point and under a pressure of about 0.1 mm. of Hg to about 5 mm. of Hg and thereafter heating said vaporized diarylsulfone at a temperature of about 600° C. to about 700° C. whereby said vaporized diarylsulfone is pyrolyzed to the corresponding p-xylylene polymer.

(References on following page)

References Cited by the Examiner

UNITED STATES PATENTS

| | | | |
|---|---|---|---|
| 2,628,982 | 2/1953 | James | 260—607 |
| 2,889,290 | 6/1959 | Capps | 260—2 |
| 2,917,468 | 12/1959 | Schnell et al. | 260—2 |
| 2,999,820 | 9/1961 | Young | 260—2 |
| 3,019,266 | 1/1962 | Buc et al. | 260—607 |
| 3,071,631 | 1/1963 | Drews et al. | 260—668 |
| 3,084,146 | 4/1963 | Errede | 260—2 |

MURRAY TILLMAN, *Primary Examiner.*

DANIEL D. HORWITZ, SAMUEL H. BLECH,
*Examiners.*

UNITED STATES PATENT OFFICE
CERTIFICATE OF CORRECTION

Patent No. 3,235,516            February 15, 1966

Edward C. Leonard, Jr.

It is hereby certified that error appears in the above numbered patent requiring correction and that the said Letters Patent should read as corrected below.

Column 12, line 4, after "diaryl-" insert -- sulfone has the formula --.

Signed and sealed this 26th day of September 1967.

(SEAL)
Attest:

ERNEST W. SWIDER            EDWARD J. BRENNER
Attesting Officer            Commissioner of Patents